(12) United States Patent
Losee

(10) Patent No.: US 6,349,601 B1
(45) Date of Patent: Feb. 26, 2002

(54) AIRCRAFT PNEUMATIC SYSTEM TEST CART

(75) Inventor: George D. Losee, Aurora, CO (US)

(73) Assignee: United Air Lines, Inc., Chicago, IL (US)

(*) Notice: Subject to any disclaimer, the term of this patent is extended or adjusted under 35 U.S.C. 154(b) by 0 days.

(21) Appl. No.: 09/329,662

(22) Filed: Jun. 10, 1999

(51) Int. Cl.[7] .................................................. G01L 7/00
(52) U.S. Cl. ........................................................ 73/714
(58) Field of Search ................................ 73/23.2, 23.25, 73/23.31, 116, 117.1, 147, 865.6, 714, 865.8, 117.2, 117.3, 117.4, 118.1; 374/45, 57, 208, 210

(56) References Cited

U.S. PATENT DOCUMENTS

| | | |
|---|---|---|
| D176,040 S | 11/1955 | Schaffer et al. |
| D184,784 S | 3/1959 | Walsh et al. |
| 3,107,517 A | 10/1963 | Loyd et al. |
| 3,412,614 A | 11/1968 | Mazurkevics |
| 3,829,773 A | 8/1974 | Nigg |
| 3,903,745 A | 9/1975 | Bolser |
| 4,030,351 A | 6/1977 | Smith |
| 4,482,114 A | * 11/1984 | Gupta et al. ............ 244/134 B |
| D294,130 S | 2/1988 | Ray |
| 4,847,770 A | 7/1989 | Kane et al. |
| D317,276 S | 6/1991 | Sousek |
| 5,071,148 A | 12/1991 | Salvucci, Sr. |
| 5,201,212 A | 4/1993 | Williams |
| 5,592,372 A | * 1/1997 | Artail et al. ............... 73/117.1 |
| 5,613,776 A | * 3/1997 | Turner et al. .............. 73/865.6 |
| 5,742,519 A | 4/1998 | McClendon et al. |
| 5,808,909 A | 9/1998 | Rees |

* cited by examiner

Primary Examiner—William Oen
(74) Attorney, Agent, or Firm—Brinks Hofer Gilson & Lione

(57) ABSTRACT

A portable aircraft pneumatic system test cart includes a cart having a surface with a pneumatic testing device, having a plurality of test gauges and a plurality of regulators, and a temperature test oven, having an outer cylinder and an inner cylinder, both disposed thereon.

22 Claims, 6 Drawing Sheets

AIRCRAFT PNEUMATIC SYSTEM TEST CART

BACKGROUND OF THE INVENTION

The invention relates to a pneumatic system testing device and, more particularly, to an aircraft pneumatic system test cart.

Conventional passenger aircraft have various pneumatic systems. An aircraft bleed system is an example of one such pneumatic system. The bleed system provides high air pressure during low atmospheric air pressure operating conditions. The high pressure air is used to provide air conditioning and cabin pressurization. Once the aircraft reaches high air pressure operating conditions the bleed system switches over to provide low air pressure. The switching function is carried out by the interaction of numerous air flow and temperature sensors with switching mechanisms.

Such a system must be periodically maintained in order to insure safe and optimum system performance. Typical maintenance involves having the aircraft brought into a hangar and having the sensors and switches replaced. Although replacing system components in such a fashion can maintain optimal system performance, it is cost ineffective. First, keeping the aircraft out of service for a relatively long period of time creates lost revenue. Second, replacing the sensors and switches while they are still operational wastes the effective lifetime of expensive components. Indeed, replacing a component once it reaches the end of its life cycle is less costly and may be done with less frequency than replacing such a component based on a preventative maintenance schedule that is independent of the life cycle of the component. Periodically testing the pneumatic system and the system componentry would solve the problem of wasted component capacity, but such a solution does not fully obviate the problem of having the aircraft out of service and in the repair hangar during such testing.

Conventional pneumatic testing equipment includes a pneumatic test box, a sensor/switch test oven, pressurized nitrogen tanks and various other items such as hoses, flex lines, electrical cords, fittings and seals. Therefore, testing the aircraft while on the tarmac is not feasible, as the necessary testing equipment is cumbersome and not easily transportable.

SUMMARY OF THE INVENTION

A portable aircraft pneumatic system test cart includes a cart with a mounting surface, having pneumatic test box and a sensor test oven disposed on the mounting surface.

An advantage of the present invention is that the test cart may be transported to the aircraft for pneumatic testing, thereby minimizing aircraft out-of-service time.

According to a preferred embodiment of the present invention, the test cart further includes at least one pressurized nitrogen tank.

These and other advantages of the invention will appear more fully from the following description in conjunction with the accompanying drawings wherein like reference characters refer to the same or similar parts throughout the several views.

DESCRIPTION OF THE PREFERRED EMBODIMENT

Figure 1:
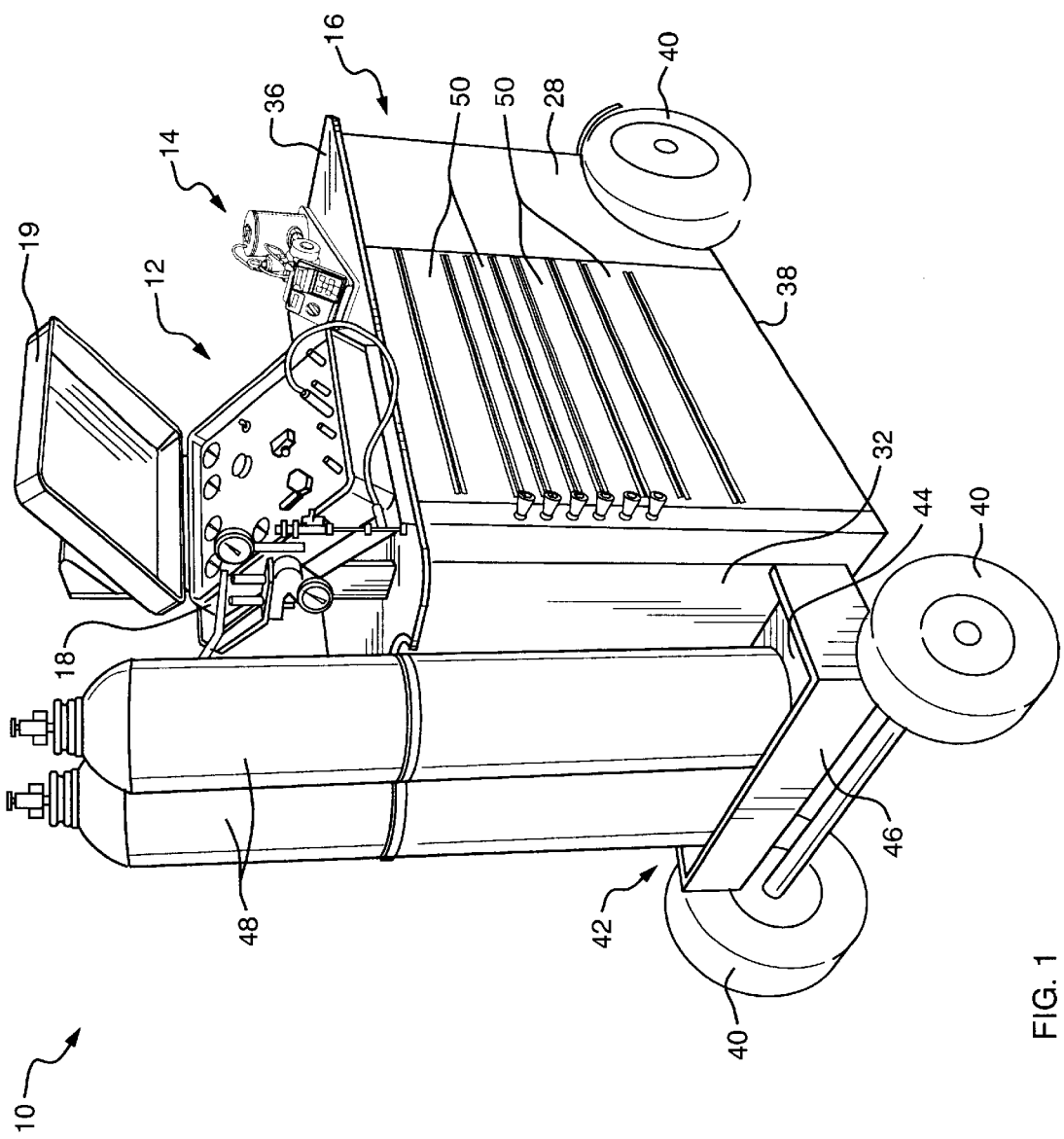
FIG. 1 is a perspective view of a pneumatic system test cart according to the present invention.

Referring now to FIG. 1, an aircraft pneumatic system test cart 10 comprises a pneumatic test box 12, a sensor/switch temperature test oven 14 and a cart 16.

Figure 2:
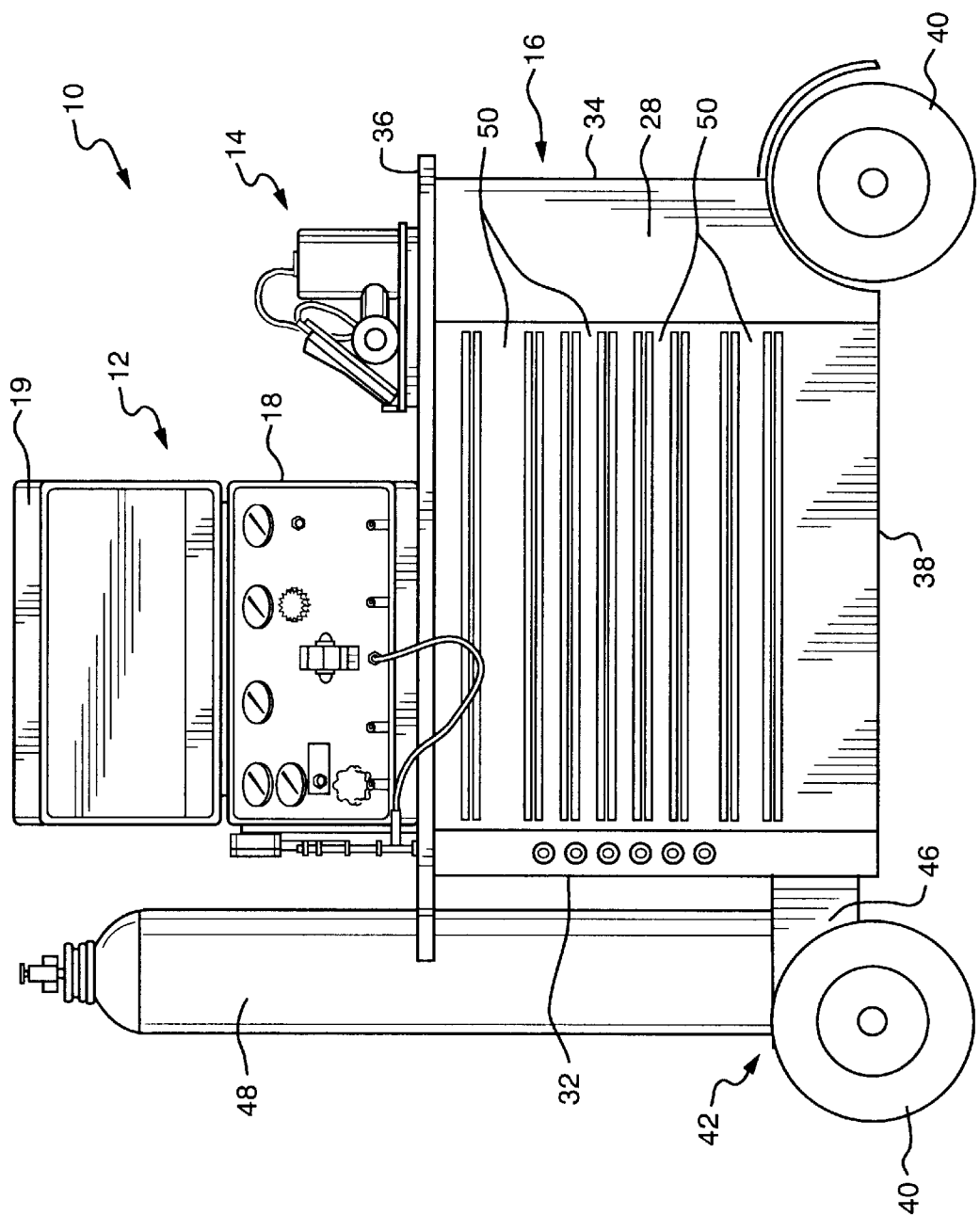
FIG. 2 is a front view of a pneumatic system test cart according to the present invention.
Figure 3:
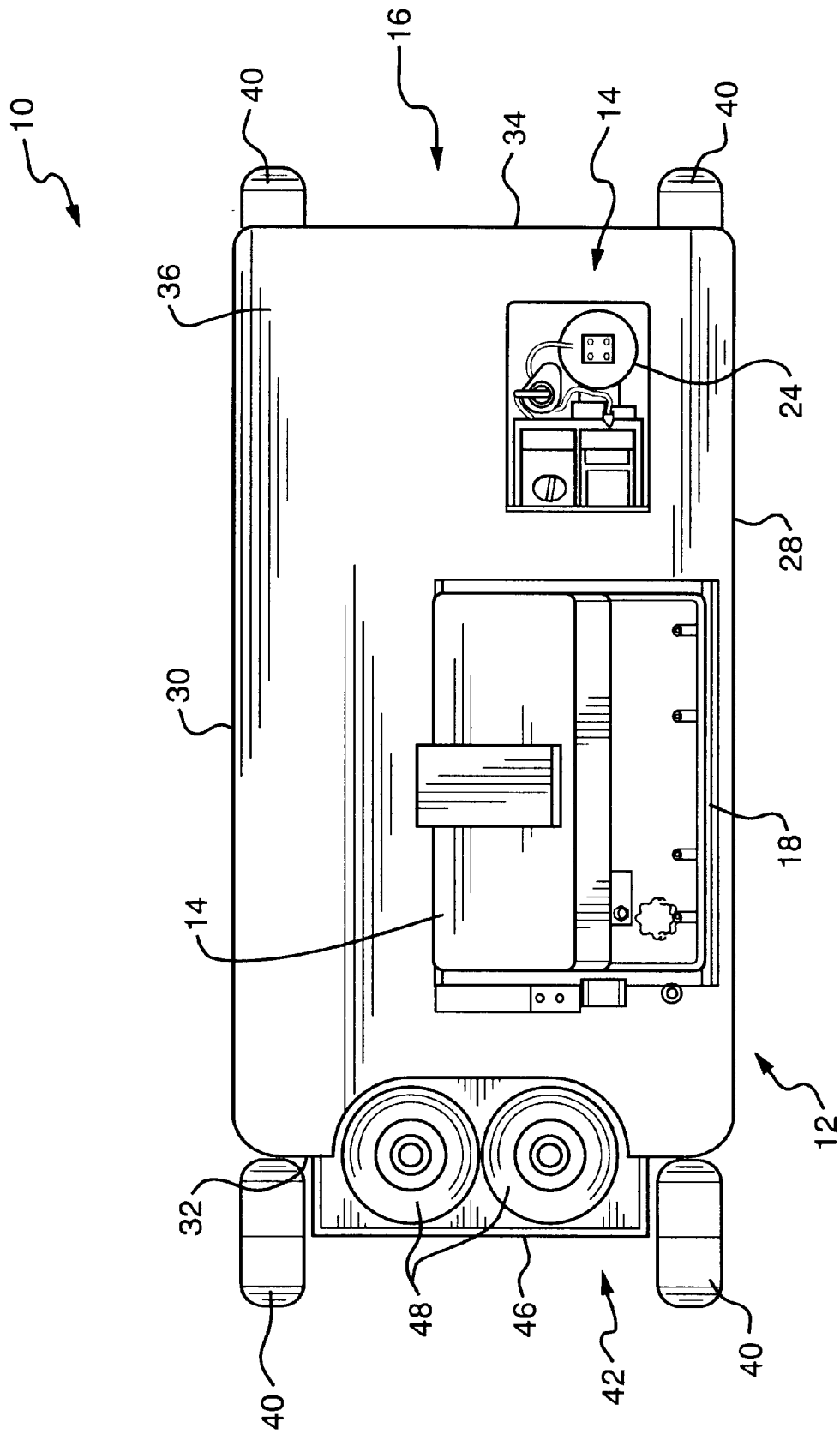
FIG. 3 is a top view of a pneumatic system test cart according to the present invention.
Figure 5:
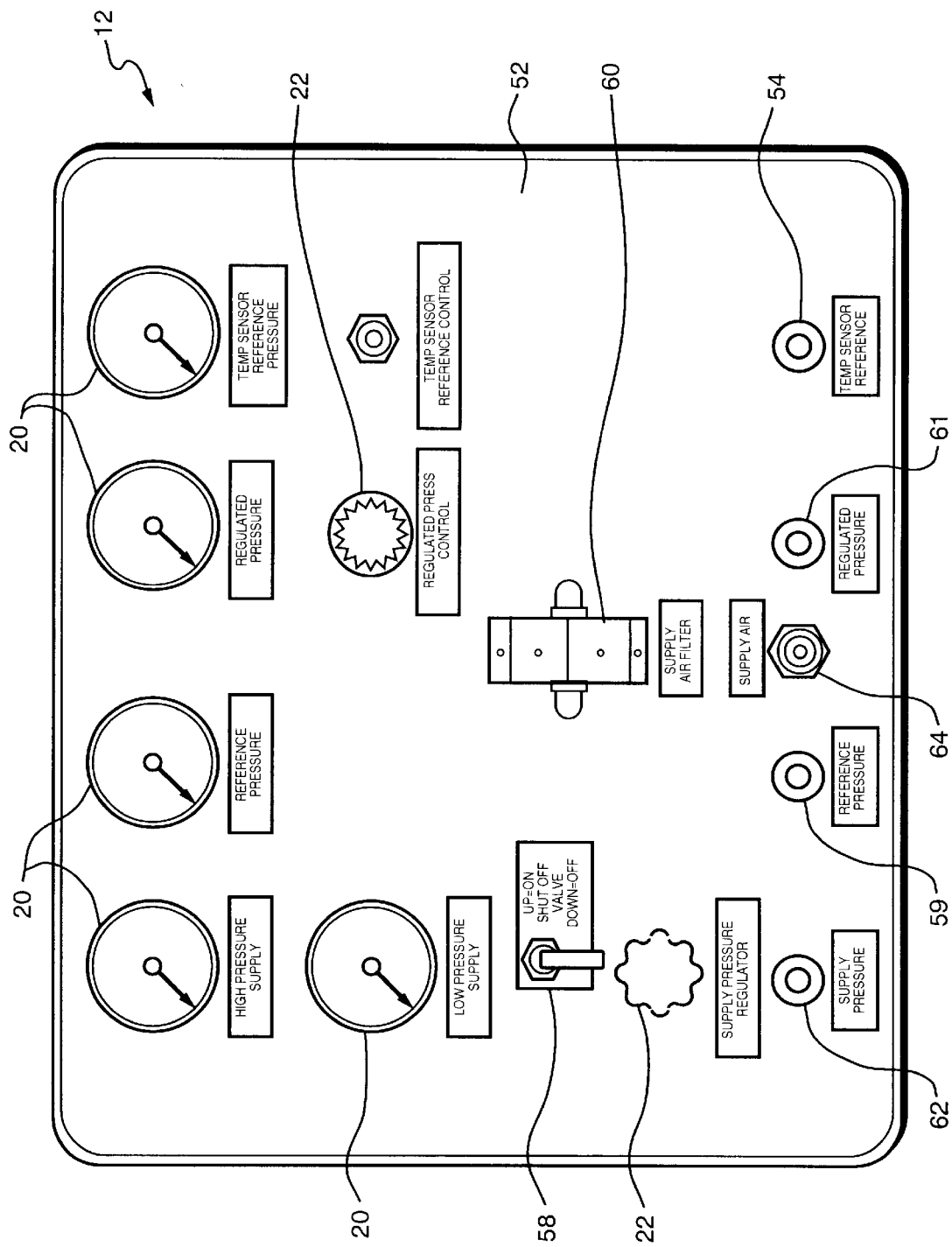
FIG. 5 is a top view of a pneumatic test box control panel according to the present invention.

As shown in FIGS. 1–3 the pneumatic test box 12 has an aluminum case 18 with a lid 19. As shown in FIG. 5, a plurality of test gauges 20 and regulators 22 are disposed on a control panel 52 of the test box 12. The gauges 20 preferably monitor high and low pressure supply, reference pressure, regulated pressure, and temperature sensor reference pressure. The reference pressure gauge has a corresponding reference pressure port 59. The regulators 22 preferably regulate pressure control and supply pressure. The pressure control regulator has a port 61 that supplies regulated pressure to a valve or to a subsystem that is to be tested. The supply pressure regulator has an unregulated upstream pressure source and a port 62 for such supply. The control panel 52 also has a temperature sensor reference control 54, an on/off shutoff valve 58, an air supply filter 60, and a pressurized nitrogen or shop air source port 64. The air nitrogen source port 64 is preferably pressurized up to 250 psi. The pneumatic test box 12 advantageously is adapted to connect directly into the entire pneumatic subsystem of the aircraft via pneumatic or electrical adapters (not shown). In this fashion, the pneumatic or electrical switches and valves may be efficiently tested as a system rather than as individual components. The tester tests the system by applying pressure at a constant rate using the pressurized nitrogen or shop air supply and monitors the system externally for any leaks or variations in pressure and proper system operation. More specifically, the system is checked to insure that a predetermined schedule of operation is complied with, for example, valve positioning and switch tripping with respect to temperature and the accuracy of sensor readings.

Figure 4:
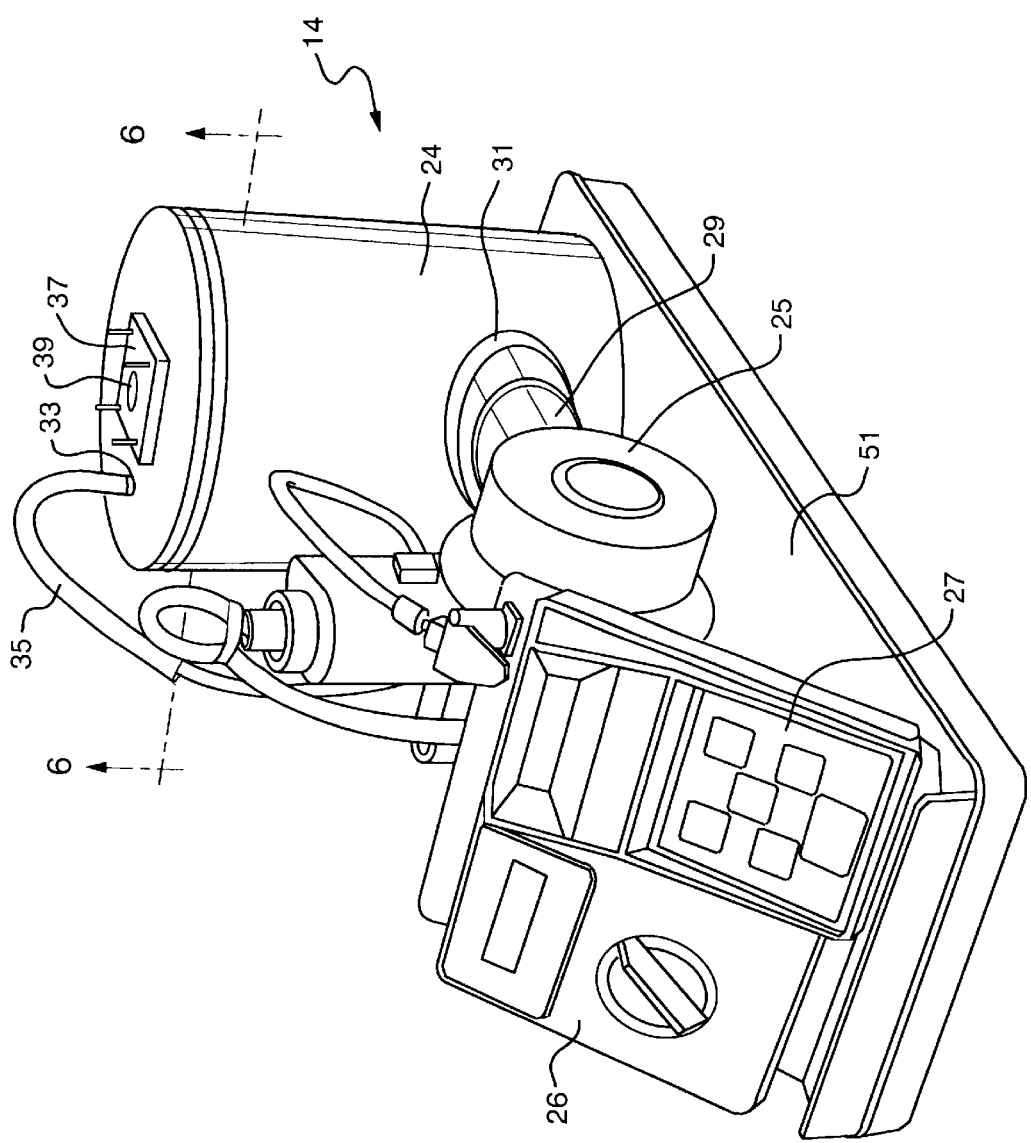
FIG. 4 is a perspective view of a temperature test oven according to the present invention.

As shown in FIG. 4, the sensor/switch temperature test oven 14 has an oven 24, a heat gun 25, and a pair of sensing devices 26 and 27, all of which are mounted on a transportable base 51. The heat gun 25 preferably is 14.5 Amp and is capable of providing heat up to 1000 degrees Fahrenheit. The heat gun 25 is coupled to the oven 24 via a tube 29. The tube 29 mates with an inlet 31 of the oven 24. A temperature-sensing device 27 is thermally coupled to the oven 24 at a port 33 via a cable 35. The temperature-sensing device 27 is preferably adapted to sense temperature up to 2000 degrees Fahrenheit. An ohmmeter 26 is adapted to be electrically coupled to an aircraft switch or sensor (not shown), as are known in the art. The oven 24 has a plate 37 with an orifice 39, which is adapted to receive such a sensor or switch when thermal testing is desired. Various plates may be used depending on what type of switch or sensor is to be tested, if the sensor is a screw in type a screw in plate is used or if the sensor is a flange mounted type a flange mounted plate is used.

Figure 6:
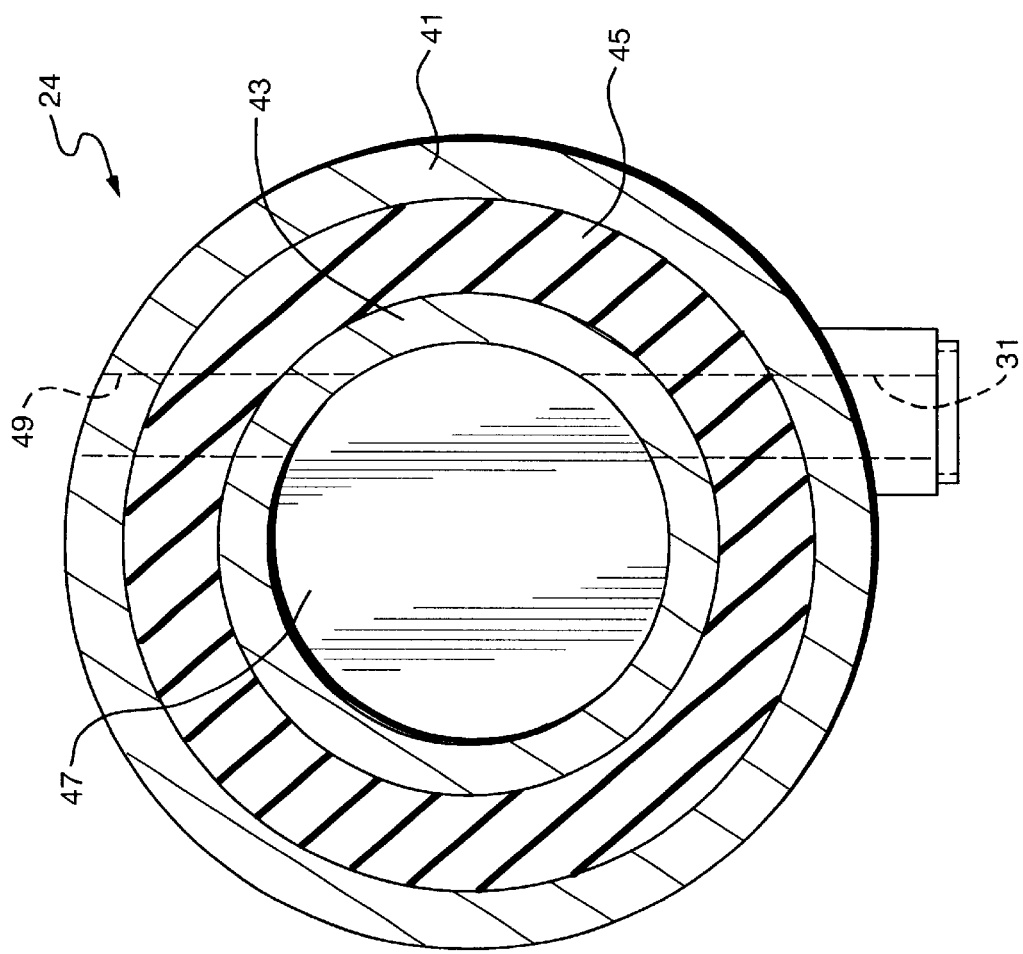
FIG. 6 is a cross-sectional view, taken along the line 6—6 of FIG. 4, of the temperature test oven.

As shown in greater detail in FIG. 6, the oven 24 has an outer cylinder 41, an inner cylinder 43, an insulation layer 45, and a heating chamber 47. The inner and outer cylinders, 43 and 41 respectively, are preferably one-quarter inch thick, but may vary in thickness without departing from the scope of the present invention. Intermediate the inner and outer cylinders, 43 and 41 respectively, is the insulation layer 45, which functions to prevent heat from escaping from the heating chamber 47. The insulation used in the insulation layer 47 is preferably high temp insulation. The inlet 31 is placed off center with respect to the longitudinal axis of the heating chamber 47. The oven 24 also has an outlet 49, preferably offset in the same fashion as the inlet 31. The outlet 49, however, is positioned a predetermined distance above the inlet 31, preferably 5.5 inches, center to center. The offset inlet 31 advantageously forces the hot air entering the heating chamber 47 from the heat gun 25 to travel in a circular fashion therein. The hot air circulating within the chamber 47 rises, is displaced by incoming hot air, and exits the chamber 47 via the outlet 49. Circulating the hot air within the chamber 47 in this fashion provides stable air temperature in the chamber 47, particularly around the central region thereof. The stable air temperature in the central region is advantageous because the tested component is placed thereat when tested.

In use, a sensor or switch is removed from the aircraft and placed in the orifice 39 of the plate 37. The sensor is electrically coupled to the ohmmeter 26. The heat gun 25 forces heated air into the chamber 47 to heat the chamber 47 to a desired temperature, as gauged by the temperature-sensing device 27. The ohmmeter 26 is used to track the continuity and resistive performance of the particular component at various predetermined temperatures. Both electrical and pneumatic switches and sensors are tested. The component is then either discarded or returned to service depending on such performance. This process is repeated for all the sensors and switches on the aircraft, advantageously discarding only those components that are no longer performing within specification.

As shown in FIGS. 1–3, the cart 16 has a front surface 28, a rear surface 30, lateral sidewalls, 32 and 34, a top surface 36, and a base 38. Preferably disposed at the base 38 is a set of four wheels 40. The wheels 40 make the test cart 10 mobile. Other mechanisms to transport the cart 10 may be used, such as a track or three-wheeled system, without departing from the scope of the present invention. Furthermore, any of the transportation systems may be motorized in order to enhance transportability of the test cart 10. Preferably located adjacent to the lateral sidewall 32 is a tank carrier 42. The tank carrier 42 has a base 44 and a perimeter sidewall 46 projecting upwardly therefrom. The base 44 and sidewall 46 form a space adapted to carry a pair of pressurized nitrogen tanks 48. The front 28 of the cart 16 preferably has a plurality of drawers 50 adapted to receive a plurality of tools as are conventionally used in the pneumatic testing arts such as hoses, flex lines, electric cords, fittings, and seals (not shown). The upper surface 36 of the test cart 10 is adapted to receive the pneumatic test box 12 and the sensor/switch temperature test oven 14 thereon. The test cart 10 with the pneumatic test box 12 and test oven 14 advantageously allows for mobile testing of aircraft pneumatic systems and various switches and sensors without having to bring the aircraft in to the repair hangar thereby saving aircraft "out of service" time. Furthermore, the pneumatic systems, switches, valves, and sensors can advantageously be tested at the same time and in any combination, whether on the aircraft, test cart, or combination of the two.

While the preferred embodiment of the present invention has been described it should be understood that various changes, adaptations, and modifications may be made without departing from the spirit of the invention and the scope of the appended claims.

What is claimed is:

1. A portable aircraft pneumatic system test cart comprising:
    a cart having a mounting surface;
    a pneumatic testing device disposed on the mounting surface; and
    a temperature test oven also disposed on the mounting surface.

2. The portable aircraft pneumatic system test cart of claim 1 further including at least one pressurized nitrogen tank.

3. The portable aircraft pneumatic system test cart of claim 1 having a plurality of pressurized nitrogen tanks.

4. The portable aircraft pneumatic system test cart of claim 1 wherein the pneumatic testing device has a plurality of test gauges and a plurality of regulators.

5. The portable aircraft pneumatic system test cart of claim 1 wherein the test oven has an inner and outer cylinder.

6. The portable aircraft pneumatic system test cart of claim 5 wherein the test oven has an insulation layer intermediate the inner and outer cylinders.

7. The portable aircraft pneumatic system test cart of claim 1 wherein the test oven has an inlet and an outlet.

8. The portable aircraft pneumatic system test cart of claim 7 wherein the inlet and outlet are offset with respect to a longitudinal axis of the test oven.

9. The portable aircraft pneumatic system test cart of claim 7 wherein a heat gun is coupled to the inlet of the test oven to force heated air into the test oven, the forced air traveling in a circular motion about the perimeter of the test oven due to the offset inlet.

10. An portable aircraft pneumatic system test cart comprising:
    a cart having a plurality of wheels, and an upper work surface;
    a pneumatic testing device disposed on the upper work surface;
    a temperature test oven disposed on the upper work surface.

11. The portable aircraft pneumatic system test cart of claim 10 further including at least one pressurized nitrogen tank.

12. The portable aircraft pneumatic system test cart of claim 10 wherein the pneumatic testing device has a plurality of test gauges and a plurality of regulators.

13. The portable aircraft pneumatic system test cart of claim 10 wherein the test oven has an inner and outer cylinder.

14. The portable aircraft pneumatic system test cart of claim 10 wherein the test oven has an insulation layer intermediate the inner and outer cylinders.

15. The portable aircraft pneumatic system test cart of claim 10 wherein the test oven has an inlet and an outlet.

16. The portable aircraft pneumatic system test cart of claim 15 wherein the inlet and outlet are offset from a longitudinal axis of the test oven.

17. The portable aircraft pneumatic system test cart of claim 15 wherein a heat gun is coupled to the inlet of the test oven to force heated air into the test oven, the forced air traveling in a circular motion about the perimeter of the test oven due to the offset inlet.

18. A portable aircraft pneumatic system test cart comprising:
    a cart having a mounting surface;

a pneumatic testing device, having a plurality of test gauges and a plurality of regulators, disposed on the mounting surface; and a temperature test oven, having an outer cylinder and an inner cylinder, also disposed on the mounting surface.

19. The portable aircraft pneumatic system test cart of claim 18 wherein the test oven has an insulation layer intermediate the inner and outer cylinders.

20. The portable aircraft pneumatic system test cart of claim 18 wherein the test oven inner and outer cylinders each have an inlet and an outlet.

21. The portable aircraft pneumatic system test cart of claim 18 wherein the test oven has an upper surface with a detachable plate, the plate having an orifice adapted to receive a testing component therethrough.

22. The portable aircraft pneumatic system test cart of claim 18 the test oven has a temperature sensing device thermally connected thereto, whereby the test oven temperature may be continually monitored.

* * * * *

UNITED STATES PATENT AND TRADEMARK OFFICE
CERTIFICATE OF CORRECTION

PATENT NO. : 6,349,601 B1
DATED : February 26, 2002
INVENTOR(S) : George D. Losee It is certified that error appears in the above-identified patent and that said Letters Patent is hereby corrected as shown below:

Column 4,
Line 35, delete "An portable" and substitute -- A portable -- in its place.

Column 6,
Line 8, insert -- wherein -- before "the test".

Signed and Sealed this

Thirty-first Day of December, 2002

JAMES E. ROGAN
*Director of the United States Patent and Trademark Office*